United States Patent Office 2,864,782
Patented Dec. 16, 1958

2,864,782

LAMP BASING CEMENT CONTAINING BORIC ACID AND HEAT-CURABLE FORMALDEHYDE CONDENSATION RESIN

James S. Mitchell, Philadelphia, Pa., assignor to The Borden Company, a corporation of New Jersey No Drawing. Application June 30, 1955
Serial No. 519,229

3 Claims. (Cl. 260—24)

This invention relates to a dual temperature range cement and the process of bonding the cement.

The application is a continuation in part of my application Serial No. 191,736 filed October 23, 1950 and now issued as Patent No. 2,712,533, issued July 5, 1955.

The invention is particularly useful as lamp basing cement in the manufacture of incandescent electric lights and will be first illustrated by description in connection with such use.

In these lights a threaded or other type of base is adhered to a glass bulb by means of the cement and the lead-in wires are passed through the cement.

For cement for such use there are severe requirements. The cement must be curable at reasonably low temperatures such as those within the range 350–400° F. to which the lamp base and cement are commonly heated during the assembly operations; effective at the highest temperatures to which it is ever subjected during use as, for instance, at temperatures of 650° F. or so for lamps of certain sizes; resistant to breaking or torsional pull of 75–125 inch per pound and electrically insulating so as to avoid short circuiting or substantial conductance of current between the lead-in wires for the incandescent filament.

Heat hardenable phenol formaldehyde condensation products are used extensively to supply a cementing material that is satisfactory over the lower part of the range of temperature to be withstood. Boric acid has been proposed in combination with phenol formaldehyde resin to provide also the high temperature qualities.

When boric acid is thus used, disadvantages are encountered. When boric acid melts (366° F.) there results a liquid decomposition product that is relatively low in viscosity. This causes excessive flow during the curing cycle. Furthermore the boric acid, when heated to such high temperatures as to cause substantially complete decomposition into a material that is of high insulating power after solidification and stable on later heating, as to 650° F., gives on solidification a mass that is hard and brittle and, therefore, subject to breakage on impact.

The present invention provides a dual range cement that overcomes these disadvantages. It provides an inorganic, heat resistant absorbent solid that retains the non-fluid nature of the whole composition when heated to the temperature of melting and dehydration of boric acid therein.

Briefly stated, the invention comprises a cement including (1) a heat hardenable (curable) resinous condensation product and (2) a mixture of boric acid with material in the form of fine particles that absorb boric acid decomposition products in liquid form and that reenforce the strength so as to increase the resistance to torsional strain of the decomposition product after cooling.

The absorbent and strength increasing or reinforcing agent is one that is inorganic and heat resistant, that is, not subject to melting or thermal decomposition to an appreciable extent up to temperatures of about 650° F. The agent should be in the form of fine grains. At the same time, it should not be so nearly impalpable as to present an objectionably large specific surface area requiring an unnecessarily large proportion of binder materials to wet the surfaces during the setting operation and bond the grains together in the finished, set cement. For this reason, I use to advantage the absorbent and strength increasing agent in the form of grains predominantly of such fineness as to pass through a 100 mesh screen and be retained on 300 mesh, as, for instance, 80% by weight of the material within this range of sieve sizes.

Marble ground to this fineness is particularly satisfactory. Other agents that may be used with results that are satisfactory for most purposes are sand and barium or strontium carbonate or sulfate minerals, all these alternative materials being milled or broken down before use to the mesh size stated and being selected to suit the particular use to which the product is to be put. The selected agent in any case should be one that is characterized by reasonable strength within the grains themselves, this strength being judged conveniently by the strength or crushing resistance of the selected material tested before being reduced to the form of fine grains.

The heat hardenable resinous condensation product may be an aldehyde such as phenol formaldehyde, melamine formaldehyde or urea formaldehyde or the resinous product may be an epoxy resin. It is made in the usual manner and with the usual proportions and supplied in the stage in which it is heat curable.

A plasticizer for the condensation product is incorporated to advantage in order that the resin component of the finished binder, like the boric acid component, may be resistant to breakage on application of torsional strain. The plasticizer used is a substantially non-volatile solvent for the condensation product. Examples of such plasticizers are rosin, dibutyl phthalate, and shellac.

All materials, when the cement is to be used in lamp bases should be electrical non-conductors either as used or after heating.

As to proportions, the granular material such as the ground marble is used in proportion substantially in excess of the weight of boric acid, as for instance, 1.5–5 parts for 1 part of the boric acid.

The proportion of boric acid in turn is about 1 part to 3 parts for 1 part of the condensation product.

The condensation product or resin is used in proportion at least equal to the weight of the plasticizer therefor as, for example 1–4 parts of the resin to 1 of the plasticizer.

All proportions here and elsewhere herein are expressed as parts by weight unless specifically stated to the contrary.

As to conditions of compounding the cement, I mix the selected components in weighed proportions thoroughly and with such grinding, if any, as may be required to reduce the particle sizes of the granular absorbent and strength increasing agent for the boric acid to that described above and also to reduce the resin, boric acid, and any other solid, such as rosin, to powdered form. If the components have been previously milled separately to the desired fineness of subdivision, then the grinding of the materials during mixing may be omitted.

More specifically, the kind of thermosetting resin, its preparation, the manner of compounding, and other details of the use of the resin along with boric acid and the infusible solid absorbent, as with a small proportion of added volatile solvent such as alcohol, may be as described in my said copending application.

Lamp bulbs, bases, and wires are also assembled as described in the said application. The assembly is cured at about 300°–400° F.

Then the second stage curing is effected by heating the assembly until the boric acid melts and decomposes. A suitable temperature for this second stage curing is 400°–500° F. The heating causes the boric acid dehydration product or products to be so associated in the combination with the resin and marble or other absorbent, perhaps chiefly as a solid solution, that the whole heated composition is satisfactorily water resistant for use as lamp basing cement.

The result is a product in which the resulting cement binder composition coats the grains of marble dust or the like and bonds them together in a structure which will withstand a torsional pull of 75–125 pounds. The bond is water resistant, especially after the boric acid and granular absorbent therefor have been heated to 450° F. or more.

The invention will be further illustrated by detailed description in connection with the following specific examples of the practice of it.

Example 1

A mixture was prepared consisting of:

Formula No. 1: Parts by weight
- Phenol-aldehyde resin _____ 10.0
- Rosin _____ 5.0
- Boric acid _____ 20.0
- Marble flour _____ 65.0
- Alcohol, denatured as solvent in an amount to form a workable paste or cement, usually 2–4 ml. per ounce of powder mixture.

This mixture was prepared as above described, the phenol-aldehyde resin being a standard synthetic resin condensed to a stage short of the "C" or fully set stage. The rosin used is the standard naval stores product. The various components were mixed dry and very thoroughly in a ball mill to produce a powder 80–300 mesh very thoroughly mixed. The resulting mixture had a shelf-life of many months.

When the mixture is to be used, the alcohol or other solvent may be added. The pot life after mixing the solvent is twenty-four hours or more.

An appropriate quantity of the cement may then be placed in the metal base shell, the lead wires properly positioned and the seal end of the lamp inserted into the base. The assembly is then baked at a temperature in the neighborhood of 350° C. to 385° C. until the phenol-formaldehyde resin is set, ordinarily a fed minutes.

The base shell so cemented is very firmly held to the glass. The cement joint will withstand a torsional pull of 75–125 inch-pounds without failure. This strength is ample for lamps whose burning life is conducted at temperatures below about 350° F.

When, however, such lamps are burned at temperatures ranging from 400° F. to 650° F. for their lifetime, it is found that the phenol-formaldehyde resin disintegrates and chars so that its bond to the metal shell and glass bulb is eventually entirely lost. Before the loss is complete, however, the cement action of the boric acid and marble dust comes into play and the second stage cementing action thereafter shows a substantially equal strength. This strength reaches at least 60 inch-pounds torsional pull, which is ample to hold the lamp in place and ample to permit removal of the burned out lamp from the socket, even in the presence of considerable oxidation or swelling of the brass.

Example 2

The procedure of Example 1 is followed except that the marble dust is replaced by an equal weight of quartz sand or any of the barium or strontium minerals disclosed above.

Example 3

The procedure of Example 1 is followed except that the phenol aldehyde resin is replaced by an equal weight of melamine or urea formaldehyde or of epoxy resin.

Example 4

A mixture was prepared utilizing the insoluble phenolic fraction of rosin sold under the trade name of "Vinsol" according to the following formula:

| | Parts |
|---|---|
| Rosin residue (Vinsol) | 13.64 |
| Hexamethylenetetramine | 1.36 |
| Boric acid | 20.00 |
| Marble flour | 65.00 |

This mixture was ball milled for one-half hour to produce a homogeneous milled mixture and was then utilized in the same way as the other binders above described. The cemented joint was found to be of excellent strength and durability, both after baking at 350° F. to 400° F. and after treatment at 600° F.

In place of the alcohol as solvent in the above examples I may use other solvents for the condensation product, plasticizer and boric acid. Thus I may use methanol or ethylene glycol.

It will be understood that it is intended to cover all changes and modifications of the examples of the invention herein chosen for the purpose of illustration which do not constitute departures from the spirit and scope of the invention.

What I claim is:

1. A dual temperature range cement prepared for use at temperatures both below and above the melting and dehydration point of boric acid, the cement consisting essentially of a mixture of (1) a heat curable resin that is a condensation product of formaldehyde with a compound selected from the group consisting of phenol, melamine and urea, (2) boric acid, (3) a non-volatile solvent for the said resin serving as plasticizer therefor and being an electrical non-conductor, and (4) a granular mineral material that is electrically non-conductive, resistant to heat decomposition at temperatures up to 650° F. and is of such size of granules that the major part by weight of the granules are finer than 100 mesh and coarser than 300 mesh, the proportions being approximately 1–3 parts of boric acid for one of the said condensation product, 1.5–5 parts of the mineral material for one of boric acid, and 1–4 parts of the condensation product for 1 of the said non-volatile solvent, the condensation product providing the bond at temperatures up to its decomposition point, and the mineral material absorbing the dehydration products of the boric acid at elevated temperature and providing therewith a cementing composition effective at temperatures above the decomposition point of said condensation product.

2. The dual temperature range of cement of claim 1, the said mineral material being marble flour.

3. In hardening the cement of claim 1 disposed in contact with and between objects to be bonded thereby, the process which comprises heating the said cement to a temperature of about 300°–400° F., continuing the heating until the said condensation product is cured, raising the temperature of the resulting mass to approximately 400°–650° F., and maintaining the 400°–650° temperature until the boric acid undergoes dehydration and the products of dehydration are absorbed over the granules of the mineral material.

References Cited in the file of this patent

UNITED STATES PATENTS

| | | |
|---|---|---|
| 1,896,042 | Ruben | Jan. 31, 1933 |
| 2,332,116 | Schmid | Oct. 19, 1943 |
| 2,606,888 | Williams et al. | Aug. 12, 1952 |
| 2,722,522 | Simonelli | Nov. 1, 1955 |

FOREIGN PATENTS

| | | |
|---|---|---|
| 489,747 | Great Britain | Aug. 3, 1938 |

UNITED STATES PATENT OFFICE

CERTIFICATE OF CORRECTION

Patent No. 2,864,782                                    December 16, 1958

James S. Mitchell

It is hereby certified that error appears in the printed specification of the above numbered patent requiring correction and that the said Letters Patent should read as corrected below.

Column 1, line 34, for "or" read -- on --; line 35, for "inch per pound" read -- inch-pounds --; column 3, line 12, for "pounds" read -- inch-pounds --; line 47, for "fed" read -- few --; line 46, for "350° C. to 385° C." read -- 350° F. to 385° F. --; column 4, line 51, after "range" strike out -- of --.

Signed and sealed this 2nd day of June 1959.

(SEAL)

Attest:

KARL H. AXLINE                                             ROBERT C. WATSON

Attesting Officer                                        Commissioner of Patents